United States Patent [19]
Moure, Jr. et al.

[11] Patent Number: 5,211,818
[45] Date of Patent: May 18, 1993

[54] METHOD FOR RECOVERING LEAD FROM BATTERIES

[76] Inventors: William B. Moure, Jr., P.O. Box 61, Falun, Alberta, Canada, T0C 1H0; Thomas H. Etsell, 3508 - 117A Street, Edmonton, Alberta, Canada, T6J 1V4

[21] Appl. No.: 682,330

[22] Filed: Apr. 9, 1991

[51] Int. Cl.$^5$ ................................ C25C 1/18
[52] U.S. Cl. ...................... 204/114; 429/49; 75/725; 75/743; 423/98
[58] Field of Search .............. 429/49; 205/252; 204/114, 115, 116, 117; 423/89, 98; 75/714, 725, 743

[56] References Cited

U.S. PATENT DOCUMENTS

| | | | |
|---|---|---|---|
| 4,096,045 | 6/1978 | Ahonen et al. | 204/114 X |
| 4,107,007 | 8/1978 | Gaumann et al. | 204/114 X |
| 4,118,219 | 10/1978 | Elmore et al. | 423/98 X |
| 4,460,442 | 7/1984 | Ducati | 204/114 |
| 4,769,116 | 9/1988 | Olper et al. | 423/98 X |

OTHER PUBLICATIONS

Bratt et al., "Production of Lead via AAS Leaching", *Metallurgical Transactions*, vol. 1, Aug. 1970, pp. 2141-2142.

*Primary Examiner*—John S. Maples

[57] ABSTRACT

A method and apparatus for recovering lead from scrap lead/acid batteries involves first mechanically breaking up the batteries into small pieces, then feeding the small pieces into a substantially vertical, upwardly diverging separation/leaching column through which ammoniacal ammonium sulphate solution (AAS) passes upwardly at a speed that allows the removal of metallic lead and lead alloys as sinks from the bottom of the column, with comminuted case material floating up and out of the column, while the lead compounds remain in suspension in the column for lead sulphate dissolution. The insoluble lead dirxide from the pastes is removed from the AAS downstream of the column and is slurried with sulphuric acid to convert the lead dioxide to lead sulphate, which is then returned to the separation/leaching column. The clarified AAS is fed to an electrowinning tank where metallic lead is plated out. Make-up anhydrous ammonia is fed into the bottom of the column, while ammonium sulphate being produced from sulphuric acid neutralization and lead sulphate reduction is recovered for fertilizer.

11 Claims, 2 Drawing Sheets

METHOD FOR RECOVERING LEAD FROM BATTERIES

FIELD OF THE INVENTION

This invention relates to a method and apparatus for recovering lead from lead/acid storage batteries of the kind utilized in automobiles, and has to do particularly with a method and apparatus for this purpose which is simple yet efficient, and yields saleable and reusable materials without presenting a pollution problem.

BACKGROUND OF THE INVENTION

Scrap car batteries constitute the largest source of secondary lead in the world. Due to the toxicity of lead as well as the quantity of lead in batteries, scrap batteries must be recycled. Increasingly stringent environmental laws have forced the closure of many smelters that process batteries. The few still operating are faced not only with environmental laws, but also the transportation problems associated with the collection of batteries over a large area. At the present time, hazardous waste laws are complicating the disposal of byproducts (such as furnace slag and waste acid electrolyte), in addition to further complicating the transportation of scrap batteries.

Although, to the best of our knowledge, no commercial battery recyclers are currently using electrochemical processing for treating scrap batteries, it is known to use ammoniacal ammonium sulphate to leach lead sulphate and lead monoxide, allowing metallic lead to be electrowon from the solution. More specifically, Bratt and Pickering, in their paper "Production of Lead via Ammoniacal Ammonium Sulphate Leaching", Met. Trans., 1 (8), 2141-49 (1970), describe what has come to be known as the AAS process. However, Bratt and Pickering do not direct themselves specifically to batteries, nor to the broader problem of dealing with all waste materials from scrap batteries (acid, case materials etc.) in an environmentally friendly process.

The present invention builds on the work of Bratt and Pickering.

Accordingly, it is an object of one aspect of this invention to provide a method and apparatus for processing scrap batteries in such a way as to yield only re-usable products, without generating any hazardous or polluting materials that need to be disposed of.

An object of another aspect of this invention is to provide an efficient and inexpensive method and apparatus for processing scrap batteries amenable to small-scale commercialization.

An object of a further aspect of this invention is to provide a method and apparatus for processing scrap batteries in such a way that the need for pollution control equipment is reduced or eliminated, thus reducing capital cost.

SUMMARY OF THE INVENTION

In accordance with the present invention, there is provided a process for recovering lead from the materials which result from the crushing of scrap lead/acid batteries. The process comprises:
using ammoniacal ammonium sulphate (AAS) to neutralize any sulphuric acid electrolyte in the crushed battery material, and to dissolve any lead sulphate in such materials; and
electrowinning dissolved lead from the AAS.

Additionally, this invention provides a process for the recovery of lead from scrap lead/acid batteries, the batteries including non-metallic case and separator material, metallic lead, and compounds in the form of paste, said process comprising the steps:
a) mechanically reducing the scrap batteries to small pieces;
b) feeding said small pieces into a substantially vertical, upwardly diverging separation/leaching column;
c) passing ammoniacal ammonium sulphate (AAS) through said leaching column in the upward direction at a throughput which permits:
   i) removing metallic lead and lead alloys as sinks from the bottom of the column,
   ii) floating comminuted case and separator material up and out of the column, and
   iii) maintaining the lead compounds in suspension for lead sulphate dissolution;
d) removing insoluble lead dioxide from the AAS downstream of the column;
e) feeding to an electrowinning tank the AAS from which the lead dioxide has been removed; and there
f) electrolytically winning metallic lead from the AAS; and
g) feeding make-up liquid ammonia to the process.

Additionally, this invention provides a process for the recovery of lead from scrap lead/acid batteries comprising:
comminuting the batteries;
using ammoniacal ammonium sulphate (AAS) to neutralize the sulphuric acid electrolyte from the scrap batteries and dissolve the lead sulphate from the lead compounds in the batteries;
passing the AAS upwardly through an upwardly diverging separation/leaching column at a throughput which separates the constituents of the comminuted batteries
removing lead dioxide from the AAS; and
electrolytically winning dissolved lead from the AAS.

Further, this invention provides an apparatus for the recovery of lead from scrap lead/acid batteries, the batteries including non-metallic case material, separator material, metallic lead, and lead compounds in the form of paste, the apparatus comprising:
a) comminuting means for mechanically reducing the scrap batteries to small pieces;
b) a substantially vertical, upwardly diverging separation/ leaching column;
c) introduction means for introducing said small pieces into said column;
d) flow control means for passing ammoniacal ammonium sulphate (AAS) through said column in the upward direction and at a throughput rate which is such that;
   i) metallic lead and lead alloys drop downwardly and are removed as sinks from the bottom of the column,
   ii) comminuted case material and separator material is floated up and out of the column, and
   iii) the lead compounds are maintained in suspension in the column for lead sulphate dissolution;
e) separation means downstream of the column for receiving AAS therefrom and for separating insoluble lead dioxide from the AAS downstream of the column;
f) an electrowinning tank downstream of said separation means, the electrowinning tank receiving from the separation means the AAS from which the lead dioxide has been removed; and g) supply means for feeding make-up liquid ammonia into the apparatus.

The environmental advantages of the present process are as only metallic lead is produced, thereby eliminating the need for smelting with its attendant formation of lead dust and sulphur dioxide;

the sole by-product is ammonium sulphate which is useful as a fertilizer; and the sulphuric acid electrolyte from the batteries is neutralized and consumed in the process thereby eliminating disposal problems thereof.

GENERAL DESCRIPTION OF THE DRAWING

One embodiment of this invention is illustrated in the accompanying drawings, in which like numerals denote like parts throughout the several views, and in which:

FIG. 1 is a view of three of the major components in a process for recycling scrap batteries; and FIG. 2 is a schematic drawing of the complete process.

DESCRIPTION OF THE PREFERRED EMBODIMENT

Providing first a general overview of this invention, we have developed an integrated process for recovering the lead from scrap lead/acid batteries as metallic lead.

In the preferred process, scrap batteries are crushed and ground, and then fed into a separation/leaching column. In this column, metallic pieces of lead are removed as sinks, the plastic case material is floated off and screened out of the AAS, and the lead compounds are held in suspension in the column for lead sulphate dissolution. The medium used to effect this separation is an ammoniacal ammonium sulphate solution, or AAS. Make-up ammonia is fed into the bottom of the separation column while ammonium sulphate is provided by the process itself (through both lead sulphate reduction and sulphuric acid neutralization). A portion of the AAS is bled off for ammonium sulphate removal (after the removal of dissolved lead), to balance that which is being produced in the process. The pregnant AAS from the leach column is circulated through an electrowinning tank, where metallic lead is electrowon. The AAS is then returned to the leaching column. The lead dioxide in the battery pastes is not soluble, and must be removed by filtration or settling between the leach column and the electrowinning tank. This lead dioxide can be converted to soluble lead sulphate by reaction with concentrated sulphuric acid at elevated temperatures, i.e., a $H_2SO_4$ concentration of 50% or greater and temperatures no lower than 80° C. This treated material (i.e., $PbSO_4/H_2SO_4$ slurry) can be fed directly into the leach column with the crushed battery material.

The environmental advantages of this process are, firstly, that only metallic lead is produced, eliminating the need for smelting and the associated production of lead dust and sulphur dioxide. Further, the only by-product is ammonium sulphate which is saleable as fertilizer. Further, the only inputs are ammonia, sulphuric acid and electricity, all readily available and relatively inexpensive. Finally, the sulphuric acid electrolyte from the batteries is neutralized and consumed in the process, eliminating disposal problems.

Figure 1:
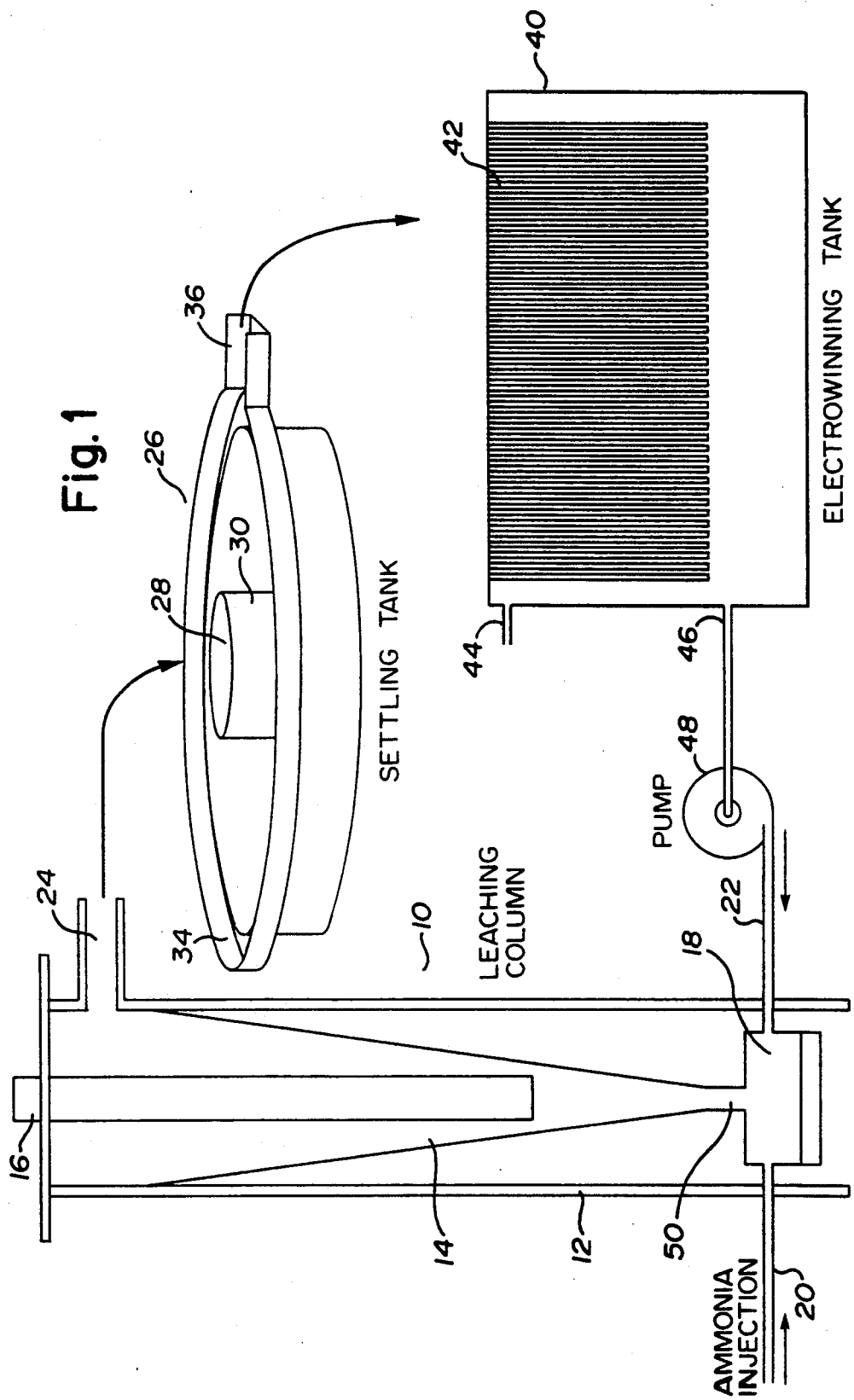

Attention is directed to FIG. 1, which illustrates the three primary components of the pilot plant apparatus used to carry out this process. A separation/leaching column shown generally at 10 is seen to consist of an outside, cylindrical supporting wall 12, an upwardly diverging hollow cone 14, a tubular feed conduit 16 extending from the top end of the column to a location about twothirds of the way down the cone 14, and a collection chamber 18 at the bottom of the column 14, in communication with the interior of the cone. In FIG. 1 the collection chamber 18 is shown to have a first input 20 for the injection of liquid ammonia, and a second input 22 through which the AAS is returned to the bottom of the leaching column. Toward the top of the leaching column 10 there is shown a leach overflow 24 which allows the plastic case material, the AAS and the dissolved material therein to pass out of the cone 14 toward a settling tank 26. At this point the plastic case material would be removed, typically with a seive 25. As can be seen in FIG. 1, the settling tank 26 is circular in plan view, and includes a central cylindrical receiving chamber 28 defined by a cylindrical wall 30, a flat bottom (not visible in FIG. 1), and an outside cylindrical outside wall. At the top of the outside wall there is provided an annular collection trough 34 with an outlet 36 adapted t deliver liquid material from the settling tank to an electrowinning tank 40. It is to be understood that, particularly in a large installation, the settling tank 26 could be replaced with another separation apparatus of known type (for example a filter or a centrifuge).

FIG. 1 shows that the electrowinning tank 40 contains a series of vertically disposed, flat, parallel electrodes 42 of known construction. It has also been found that the use of baffles (not illustrated) in the tank 40 improves efficiency greatly.

At the left side of the electrowinning tank 40 shown in FIG. 1 there is an outlet 46 which leads to the intake of a pump 48. The pump 48 pumps the AAS from the tank 40 back to the inlet 22 of the collection chamber 18 at the bottom of the leaching column. An overflow conduit 44 is provided for AAS overflow from which ammonium sulphate is recovered.

Looking again at the leaching column 10 shown in FIG. 1 it will be appreciated that, because of the inverted cone 14, a constant throughput of the AAS solution flowing upwards will result in a flow velocity decrease with height in the column, due to the fact that the cross-sectional area of the cone 14 increases with height. This creates a velocity regime in the column such that metallics (lead and lead alloy) will sink to the bottom into the collection chamber 18, while plastics, separators and other light materials will be carried out of the column by the solution flow. Finally, the Pb compounds in the pastes will be held in suspension in the column at the point where their downward velocity relative to the AAS equals the upward velocity of the solution. They remain suspended as they dissolve, gradually rising higher as their size decreases. At the bottom of the cone 14 there is provided a 2.5 cm choke 50, to give the AAS flow a velocity through which only the heavy metallic pieces (lead, lead alloy) can penetrate. The battery fines resulting from the comminuting step (to be described below) are fed into the cone 14 through the conduit 16, arranged to introduce the fines into the column at a point roughly 10 cm above the choke 50. In the pilot plant we designed, the conduit 16 had a 4 cm internal diameter.

Figure 2:
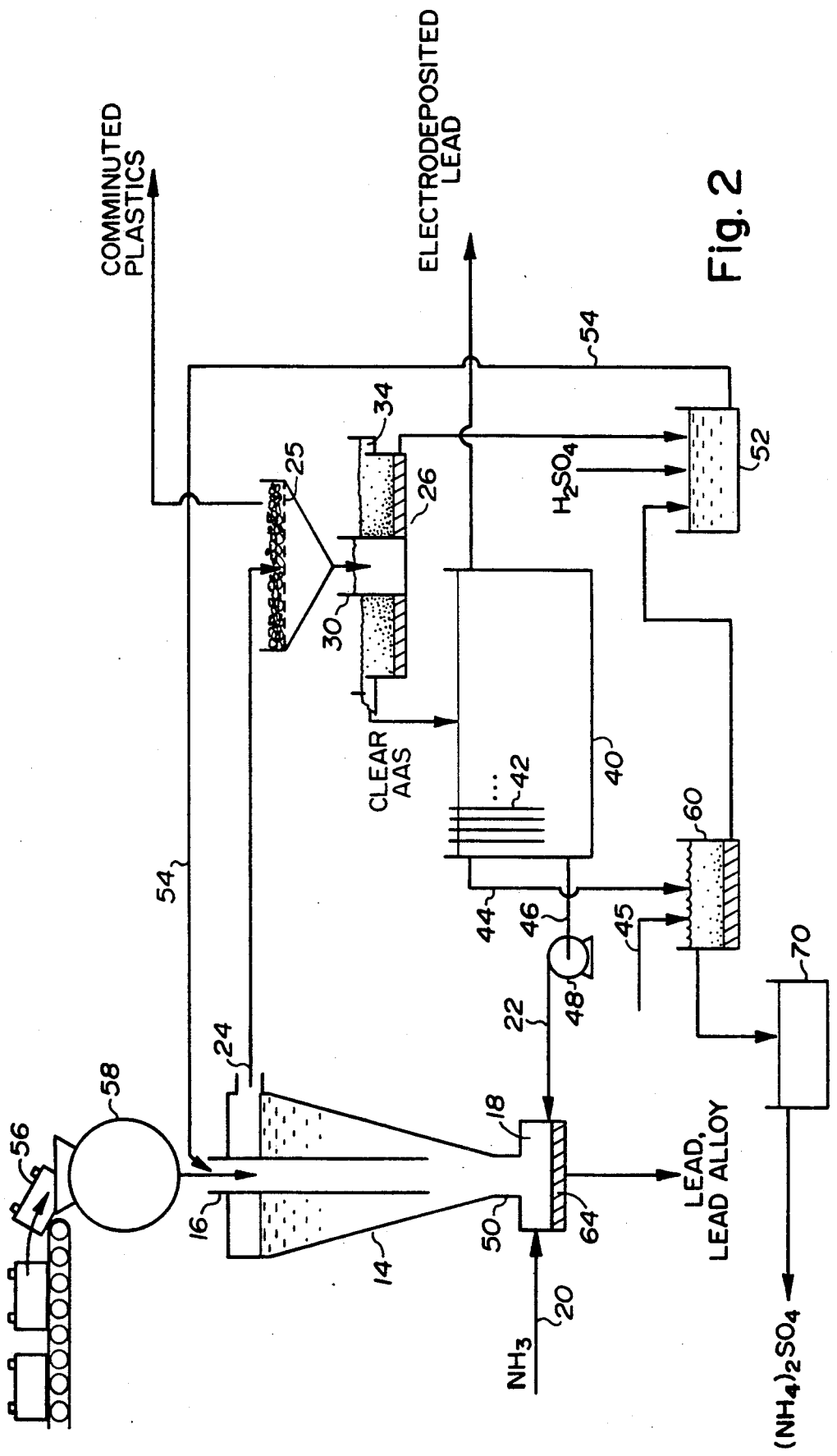

Battery pastes also contain $PbO_2$, i.e. lead dioxide. This material will not dissolve in the AAS and due to its small particle size tends to be carried out of the cone 14 through the leach overflow 24. The purpose of the settling tank 26 is to allow the $PbO_2$ to settle out as a slime at the bottom, and avoid the carryover of this material into the electrowinning tank 40 where it can contaminate the cathodic Pb. In our pilot plant, the settling tank was constructed from the bottom of a plastic 45 gallon drum and followed the design of a conventional thickener. As can be seen in FIG. 2, the $PbO_2$ slimes are removed to a slurry tank 52 and are there slurried at elevated temperatures with $H_2SO_4$ in order to convert the $PbO_2$ to $PbSO_4$. The $PbSO_4$/$H_2SO_4$ slurry can then be fed back directly into the leach column, this being shown in FIG. 2 by the return line 54.

In our pilot plant, the electrowinning tank 40 was a rectangular box constructed of lucite, with grooves machined in the sides to hold the rectangular plate electrodes. There were ten electrodes made of mild steel, and only the two end electrodes were connected to the D.C. power source. "Lucite" baffles were installed in an alternating fashion above and then below each successive electrode, requiring the AAS to flow first under and then over each successive electrode, forcing the solution to flow between each pair of electrodes in turn.

The complete apparatus just described must be sealed to prevent $NH_3$ evaporation.

It will be appreciated that the following factors are those over which the operator has control:
1. The electrowinning voltage and current;
2. The battery material feed rate;
3. The $NH_3$ feed rate;
4. The AAS flow rate;
5. The addition of various organic additives; and
6. The electrode spacing.

A series of operating runs with our pilot plant showed the process to be relatively stable. As would be expected, the optimization of the operating parameters often meant finding the best compromise in a trade-off situation. For example, the higher the battery material feed rate, the more material was "lost" to the settling tank (the higher feed rate increased the slurry density of the AAS which then "floated" larger particles). However, the higher feed rate yielded a higher Pb concentration in the AAS, which resulted in more efficient electrowinning. Another example is the AAS flow rate. Higher flow rates resulted in better "cleaning" (i.e. higher metal content) of the material reporting to the leach column collection chamber, but also tended to wash more fines out of the column, decreasing the leaching efficiency.

The following optimum conditions for the pilot plant we constructed are given for information only, and are in no sense limiting in terms of the breadth of the invention. The conditions were:

a) An AAS flow rate of 9 liters/min (or an AAS velocity of 30 cm/sec through the choke);
b) A low $NH_3$ feed rate (enough to maintain the $NH_3$ concentration between 60 and 100g/liter) (The ammonium sulphate concentration ranges between 200 to 300g/liter);
c) A battery feed rate of approximately 50 g/min of paste material; and
d) an electrowinning current of 30 amps yielding a current density of approximately 3.5 amps/sq.dm.

With these parameters, approximately 65% of the feed was converted to metallic Pb by the pilot plant, with about 10% being recovered as sinks. Thus, approximately 25% of the feed was reporting to the settling tank. Recovery of the Pb contained in the settling tank slimes was effected by treating the slimes with a 50% $H_2SO_4$ solution at 90° C. for 12 hours, then feeding this slurry back into the separation/leach column. The electrowinning operated at a current efficiency of 80% and an energy consumption of 0.7 kwh/kg cathodic Pb.

It was observed that the cathode deposit was very loose and spongy, making it necessary to constantly scrape the deposit from the cathodes in order to prevent short circuiting. For this reason, the top of the electrowinning tank was left open to provide access to the cathodes. With the above-mentioned parameters, the $NH_3$ consumption of 3.5 kg/kg cathodic Pb is an indication of the amount of $NH_3$ evaporation taking place, rather than the $NH_3$ consumption of the process itself. Theoretically, for lead sulphate reduction the process requires 0.16 kg $NH_3$/kg cathodic Pb. A lower battery material feed rate coupled with a lower electrowinning current would result in more efficient operation of the plant, but the plant productivity would be reduced accordingly.

Turning now to the process of the present invention as a whole, there is shown at the upper left in FIG. 2, a scrap battery 56, about to be fed to a hammermill 58 or equivalent device. In FIG. 2 at lower right there is shown a precipitation tank 60 to which the overflow 44 from the electrowinning tank is fed. The remaining lead in the AAS is precipitated out as $PbCO_3$ or $PbSO_4$ by the addition of $(NH_4)_2CO_3$ or $Na_2S$ via line 45 into the precipitation tank. The precipitated lead can be converted to $PbSO_4$ in the same manner as the $PbO_2$ in the slurry tank 52. Ammonium sulphate is then recovered from the lead-free AAS in the crystallizer 70 for fertilizer or, alternatively, the AAS can be sold directly as liquid fertilizer.

It will thus be understood that the AAS process utilized in this invention has many advantages over other processing techniques, the most important of which are the environmental problems it solves. The materials are always kept wet during processing, so there is no chance of Pb dust being produced. The final process step for both Pb from the metallics and from the pastes is simply melting, where emissions are easily controlled. Therefore, the only chance of fugitive emissions are AAS spills. Since such spills are liquid however, they are easily detected and cleaned up. Battery acid handling is eliminated as the AAS can be introduced at the battery crushing stage where it will neutralize the acid immediately. Finally, $PbSO_4$ is reduced electrochemically, so that sulphur emissions are eliminated. The sulphur from both the acid and the $PbSO_4$ is recovered as $(NH_4)_2SO_4$.

FIG. 2 shows the process inputs, which include the scrap batteries 56, liquid $NH_3$, $H_2SO_4$, precipitating agent (either $(NH_4)_2CO_3$ or $Na_2S$) and electricity. The process outputs are shown in FIG. 2, these being electrodeposited lead, crystallized $(NH_4)_2SO_4$, comminuted plastic case material and separator material (paper or PVC), and lead or lead alloy sinks 64 which are shown to be collected in the chamber 18.

Over and above the advantages related to the low cost of the input materials and the useability of the end products, the present process shows even more advantages when compared to conventional procedures. The pastes suspended in the leach column will act as a heavy medium to enhance the separation of the battery components. Also, the final plastics and metallics products should be cleaner than with other mechanical processing, since pastes adhering to their surfaces can be dissolved by the AAS rather than relying solely on mechanical separation. Finally, the system operating at normal temperature and pressure will help to reduce energy consumption and the materials handling can be easily automated, which will help to keep down labor costs.

While one embodiment of this invention has been illustrated in the accompanying drawings and described hereinabove, it will be evident to those skilled in the art that changes and modifications may be made therein without departing from the essence of this invention, as set forth in the appended claims.

THE EMBODIMENTS OF THE INVENTION IN WHICH AN EXCLUSIVE PROPERTY OR PRIVILEGE IS CLAIMED ARE DEFINED AS FOLLOWS:

1. A process for recovering lead from the materials which result from the crushing of scrap lead/acid batteries, the process comprising:
    using ammoniacal ammonium sulphate solution (AAS) to neutralize any sulphuric acid electrolyte in such materials, and to dissolve any lead sulphate in such materials; and
    electrowinning the dissolved lead from the AAS.

2. The process as set forth in claim 1 wherein insoluble lead dioxide is removed from the AAS prior to said electrowinning step.

3. The process as set forth in claim 2 wherein the lead dioxide is reacted with hot sulphuric acid to convert it to lead sulphate which is then returned to the AAS.

4. The process as set forth in claim 1 wherein the same AAS is also used to facilitate separation of the solid components in the said battery material.

5. A process for the recovery of lead from scrap lead/acid batteries comprising:
    comminuting the batteries;
    using ammoniacal ammonium sulphate solution (AAS) to neutralize the sulphuric acid electrolyte from the scrap batteries and dissolve the lead sulphate from the lead compounds in the batteries;
    passing the AAS upwardly through an upwardly diverging separation/leaching column at a throughput which separates the constituents of the comminuted batteries, removing lead dioxide from the AAS; and electrolytically winning lead from the AAS.

6. The process as set forth in claim 5 wherein the lead dioxide is reacted with hot sulphuric acid to convert it to lead sulphate which is then returned to the AAS.

7. A process for the recovery of lead from scrap lead/acid batteries, the batteries including non-metallic case and separator material, metallic lead, and lead compounds in the form of paste, said process comprising the steps:
    a) mechanically reducing the scrap batteries to small pieces,
    b) feeding said small pieces into a separation/leach column,
    c) passing ammoniacal sulphate solution (AAS) through said leaching column at a throughput which permits:
        i) removing metallic lead and lead alloys as sinks from the bottom of the column,
        ii) floating comminuted case and separator material u and out of the column, and
        iii) maintaining the lead compounds in suspension for lead sulphate dissolution,
    d) removing insoluble lead dioxide from the AAS downstream of the column,
    e) feeding to an electrowinning tank the AAS from which the lead dioxide has been removed, and there
    f) electrolytically winning metallic lead from the AAS, and
    g) feeding make-up liquid ammonia to the leaching column.

8. The process as set forth in claim 7 further comprising reacting the lead dioxide with hot sulphuric acid to form lead sulphate which is then returned to the AAS.

9. A process as set forth in claim 1 wherein subsequent to the electrowinning step, ammonium sulphate is recovered from the AAS solution.

10. A process as set forth in claim 5 wherein subsequent to the electrowinning step, ammonium sulphate is recovered from the AAS solution.

11. A process as set forth in claim 7 wherein subsequent to the electrowinning step, ammonium sulphate is recovered from the AAS solution.

* * * * *